Patented Jan. 12, 1954

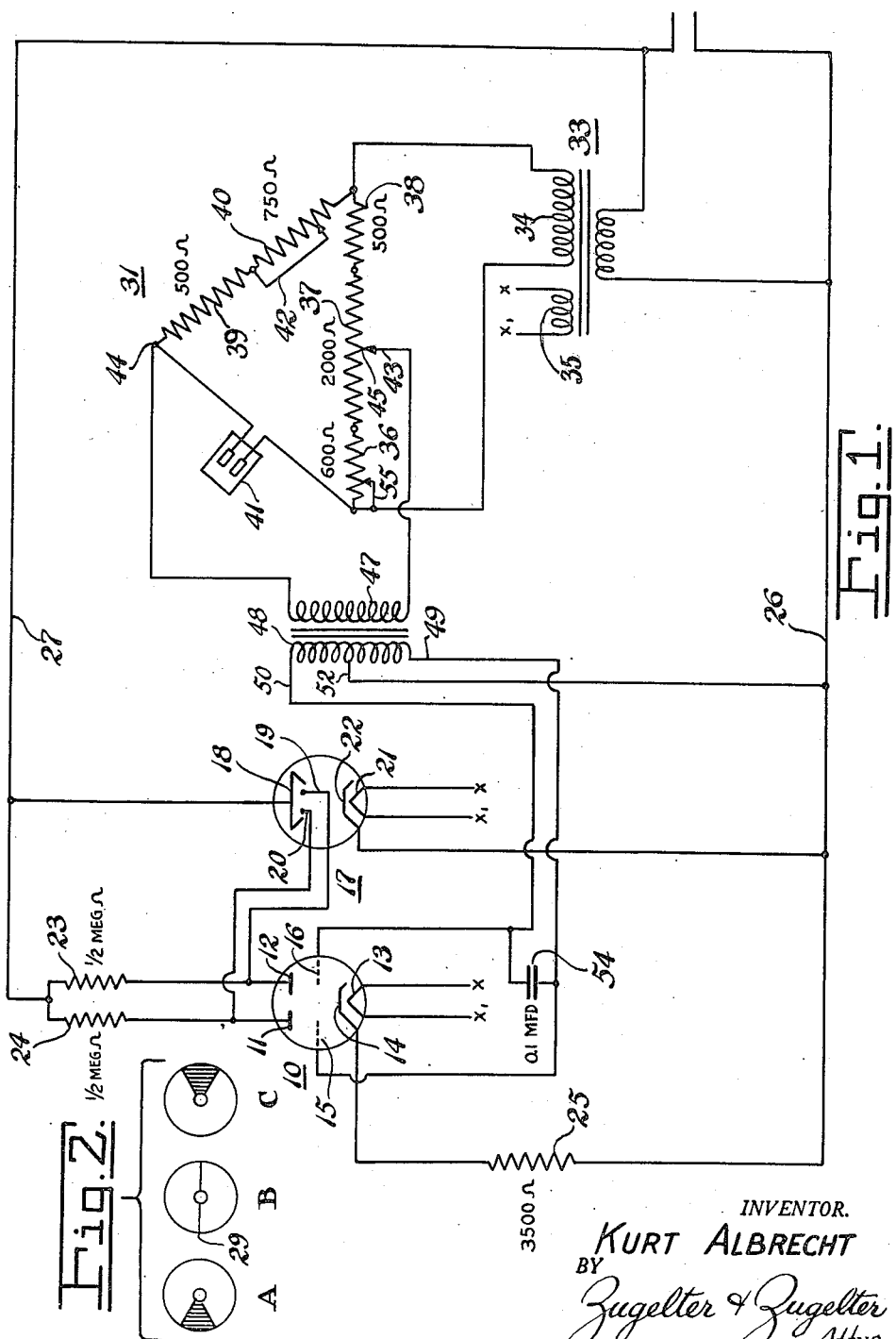

2,666,164

UNITED STATES PATENT OFFICE 2,666,164

ELECTRONIC CONDUCTIVITY METER

Kurt Albrecht, Pleasant Hills Borough, Pa., assignor to Hall Laboratories, Inc., Pittsburgh, Pa., a corporation of Pennsylvania Application September 29, 1948, Serial No. 51,662

2 Claims. (Cl. 315—26)

This invention relates to electronic meters and more particularly to a meter provided with an alternating current Wheatstone bridge, a plurality of vacuum tube grid-controlled plate circuits, and a cathode ray discharge tube so connected to the plate circuits that the cathode ray tube not only indicates balance but unbalance of the Wheatstone bridge and the direction of unbalance as well.

An object of this invention is to provide an electronic conductivity meter of the character referred to above that shall be extremely simple insofar as the circuit is concerned, operable from the ordinary 110 volt alternating current service outlets without the use of high voltage transformers in any of its circuits and branches and arranged to give visual balance, and directional indication of unbalance.

A further object of the invention is to provide a conductivity meter of the type referred to above, in which the balance point of the bridge is sharply and accurately defined by the cathode ray discharge tube, and the direction of unbalance, when unbalance occurs, thereby enabling one to make accurate measurements of conductivity of solutions, the resistance value of unknown resistances, or the use of resistance thermometers in the bridge at the point where the unknown resistance or conductivity will be determined, all as will be apparent to those skilled in this art from the following specifications and drawings hereto annexed.

These and other objects are attained by the conductivity meter embodying the invention described in the following specification and illustrated in the accompanying drawings, in which:

Figure 1 is a diagrammatic illustration of an electronic conductivity meter arranged and constructed in accordance with what now appears to be a preferred form of the invention; and Figure 2 is a group view illustrating the balance point of the cathode ray discharge tube and the shadow which develops when the Wheatstone bridge is unbalanced in either direction from the balance point.

Throughout the specification and drawings like reference characters indicate like reference parts.

In Figure 1 is illustrated a vacuum tube 10 which provides two independently controlled plate circuits. It is preferred that tube 10 be a high $\mu$ twin triode. It is to be understood that two tubes, each having a single plate, could also be employed but the twin triode is preferred. Tube 10 may be of a type known as the R. C. A. "6SC7." This tube includes plates or anodes 11 and 12, a cathode heater 13, an indirectly heated cathode 14 and control grids 15 and 16 associated with plates 11 and 12, respectively. The meter includes also a cathode ray discharge tube 17 of the type known as the R. C. A. "6AF6G" tube. This tube includes a plate or target 18, which, when bombarded, gives off a fluorescent green color, all as is well known to those skilled in this art. The tube is provided with a plurality of control electrodes 19 and 20, an indirectly heated cathode 22, and a cathode heater 21. The target or anode 18 of tube 17 is connected to the plate side of the circuits for plates 11 and 12 containing resistors 23 and 24, and the indirectly heated cathodes 14 and 22 are connected to input conductor 26. The common connection of the target 18 and the plates 11 and 12 through resistors 23 and 24 is connected to an input conductor 27. Input conductors 26 and 27 may be plugged into any service receptacle having 110 volt commercial frequency alternating current. Control electrode 20 of tube 17 is connected to the plate circuit 11 between resistor 24 and plate 11, and the control electrode 19 is connected to the plate circuit 12 between resistor 23 and plate 12. It will be apparent that electrode 19 can also be connected to resistor 23 at such a point between the ends thereof as will provide the necessary drop in potential to affect a change in the potential of electrode 19 with respect to the potential of electrode 20.

When control grid 15 is more positive than control grid 16 more current flows through resistor 24 and plate 11 to the cathode 14 than through resistor 23 and plate 12 to cathode 14, causing the voltage or potential at the point where control grid 20 is connected in the circuit of plate 11, to change with respect to the potential on control grid 19. This change causes electrons to be deflected to one side of target 18 and produce a shadow such as shown at A in Figure 2. When more current flows through the circuit of plate 12, than through the circuit of plate 11, control grid 16 being more positive than control grid 15, the potential on control grid 19 is changed with respect to the potential on grid 20. This change causes deflection of electrons to the other side of target 18, thereby producing a shadow such as shown at C in Figure 2. When both control grids 15 and 16 are at the same potential and the same amount of current flows through the plate circuits of plates 11 and 12 and is determined by bias resistor 25 then target 18 of tube 17 is free of shadow as the electrons striking it are uniformly distributed, there being only a narrow slit or mark extending diametrically across it as indicated by the line 29 in part B of Figure 2. The current in the plate circuits of plates 11 and 12 may be adjusted to equal values at the null point of bridge 31 by adjusting bias resistor 25 to proper value or selecting a resistor having such value.

A Wheatstone bridge 31 is provided to control tubes 10 and 17 and is operated on alternating current. Tube 17 indicates when the bridge is in balance, when it is out of balance, and the direction of unbalance. The input voltage therefor is derived from a transformer 33 having a primary winding connected to the input conductors 26 and 27, and a secondary winding 34 which reduces the voltage to a value much lower than the voltage impressed on the input conductors 26 and 27. I have found that a voltage of 6 volts is sufficient for input to the Wheatstone bridge but a higher voltage of 30 to 40 volts gives better sensitivity. Transformer 33 is also provided with a low voltage winding 35 for supplying heating current to the cathode heaters 13 and 21 of tubes 10 and 17.

The Wheatstone bridge comprises a plurality of resistors 36, 37 and 38 which are connected in series and form two legs or branches of the bridge, a plurality of resistors 39 and 40 connected in series which form a third leg of the bridge, and a dip cell 41 which forms the fourth leg of the bridge. Resistor 40 may be a variable resistor provided with a slider 42 or equivalent, by means of which the bridge may be adjusted to compensate for deviation in temperature of the solution in which dip cell 41 is immersed from a reference or standard temperature. Bridge resistor 37 and a slide wire contactor 43 provide a means for balancing the bridge against the conductivity of the solution to be determined. The transformer winding 34 is connected to the input terminals of the bridge formed by the junction of resistors 38 and 40 and resistor 36 and the connection leading to one terminal of the dip cell. The output or balance points of the bridge 44 and 45 (the point 45 being determined by the point of contact of the slider contact 43 with resistor 37) are connected to the primary winding 47 of transformer 32. The secondary or output winding 48 of this transformer has its opposite terminals 49 and 50 connected to control grids 15 and 16 respectively, of tube 10. Winding 48 is provided with a mid-point tap 52 which is connected to input conductor 26 whereby the indirectly heated cathodes 14 and 22 of tubes 10 and 17 are connected to the mid-point of winding 48. As shown, a condenser 54 may be connected across the control grids 15 and 16. This condenser serves the purpose of a stabilizing condenser.

If it be assumed that the dip cell 41 is immersed in a solution of known conductivity, or that a resistor of known ohmic value is substituted therefor and the bridge balanced, the potential difference across the output terminals 44 and 45 of the bridge will be zero and no current will flow through winding 47 of transformer 32. Under such conditions the same current flows in both of the plate circuits, including plates 11 and 12 of tube 10. Therefore, since the same current is flowing through both of the plates 11 and 12, the potential on the control grids 19 and 20 of tube 17 will be so sufficiently alike that the target 18 will receive uniform distribution of electrons and no shadows corresponding to either portions A or C of Figure 2 will appear. Instead, a thin, narrow line only will be visible on the tube as indicated at B. This is the balance point of the bridge. If the slider 42 of resistor 40 is adjusted to either increase or decrease the resistance of the leg of the Wheatstone bridge in which resistors 39 and 40 are included, then the potential at point 44 will either be higher or lower than it is at point 45, so that either control grid 15 or 16 will be rendered positive and cause its associated plate circuit to pass more current. If more current is passed by plate 12, then, as explained previously, the potential of control grid 19 is changed and a shadow appears as shown in part C of Figure 2, whereas, if control grid 15 is rendered relatively more positive than control grid 16, more current will flow in the plate circuit including plate 11, whereby the control potential on grid 20 is changed and a shadow appears on target 18 corresponding to that indicated by part A of Figure 2.

As may be observed by inspection of Figure 1, the voltage impressed on plates 11 and 12 and target 18 are always in phase with each other, whereas the potentials impressed on control grids 15 and 16 are always out of phase. Thus when control grid 15 is positive, a current flow in transformer winding 47 being assumed, control grid 16 is negative, and vice versa. The unbalance of the Wheatstone bridge caused by an unknown resistance in the dip cell 41 operates to change the phase of the voltages impressed on the control grids 15 and 16, in accordance with the direction of unbalance of the bridge. Thus, if the potential at point 44 of the bridge is higher than it is at point 45, current will flow from point 44 through transformer winding 47 to point 45 of the bridge. In this case control grid 16 would be negative and control grid 15 positive, so that current would flow in the circuit, which includes plate 11. When the potential at point 45 is higher than at point 44 the phase relations in the transformer 32 are reversed and the current will flow through winding 47 from point 45 through winding 47 to point 44. In this case, control grid 16 becomes positive, and control grid 15 negative, so that current flows in the circuit of plate 12. By adjusting the position of slider 42 associated with resistor 40 in the direction indicated by the directional unbalance shown by target 18, the bridge may be restored to balance, the balance being indicated by the narrow slit indicated in part B of Fig. 2.

A dial (not shown) but customarily employed with adjustable resistors may be operatively connected with slide contact 43 and calibrated against known values of resistance in the dip cell arm of the bridge. This calibration may be in ohms or in reciprocal ohms, often termed micromhos, providing a direct reading for each position of the slider contact 43 of the value of the unknown resistance of the dip cell branch.

While the ohmic resistance value of resistors 23, 24, and 25 may vary with the design of the circuit, as may also the ohmic resistance value of the resistors comprising the Wheatstone bridge, I have found that the following values for resistance provide a sensitive and accurately operating conductivity meter for measuring conductivities of solutions in which dip cell 41 is immersed varying over a range of approximately 500 to 7000 micromhos when the cell has a constant of 2:

| | |
|---|---|
| Resistors 23 and 24 | ½ megohm |
| Resistor 25 | 3500 ohms |
| Variable resistor 36 | 0 to 600 ohms |
| Variable resistor 37 | 2000 ohms |
| Variable resistor 40 | 0 to 750 ohms |
| Resistors 38 and 39 | 500 ohms each |

I have found also that a transformer 33 which provides 40 volts output on its secondary winding 34, a sufficient operating voltage for the bridge, and has a winding 35 which produces the voltage for which the heaters for the indirectly heated cathodes 13 and 21 are designed, is satisfactory. This voltage is usually about 6 volts. I have also found that a condenser 54 having a capacity of 0.1 micro-farad is sufficient for its functional purpose.

If it is necessary or desirable, resistor 36 may be made adjustable by means of a slide wire contact 55, the purpose of which is to adjust the Wheatstone bridge to compensate in part for variations in the characteristics of the dip cell employed.

While I have shown a transformer coupling between the control grids 15 and 16 of tube 10 and the output terminals of bridge 31 it will be apparent to those skilled in this art that a resistance coupling may be employed. In such a coupling a resistor would be connected to the output terminals of the bridge, the mid-potential or neutral point thereof would be connected to line 26 like the mid-tap 52 of winding 48 is connected, and grids 15 and 16 would be connected to the resistor at opposite sides of the mid-point thereof.

The conductivity meter such as shown and described, is particularly useful in the measurement of conductivity of solutions such as boiler waters containing dissolved solids, the conductivity thereof being a measure of the concentration of such solids. Obviously, the meter may be used to measure the conductivity of other solutions. Also, it will be apparent to those skilled in this art that in place of the dip cell 41 a resistance thermometer may be substituted therefor, and the device employed to measure temperature. Other uses will be apparent to those skilled in this particular art without further particularization.

Having thus described the invention, what I claim as new and desire to secure by Letters Patent is:

1. A circuit for controlling the selective energization of diametrically opposite portions of the target in a cathode ray tube, having a control electrode for each portion of the target and a heated cathode, comprising a high $\mu$ twin triode tube, a resistor connected to each plate of the triode tube, the opposite side of each of said resistors being connected together and being adapted for connection to the same side of an alternating current voltage supply source, said twin triode tube having a cathode and a heater therefor, and a control grid for each plate, said cathode being connected to one side of a resistor of relatively high ohmic value, the other side of said resistor being adapted for connection to the other side of said voltage supply, the cathode ray tube having its target connected to the supply voltage side of the plate resistors of the twin triode tube, and its control electrodes connected respectively to the plate sides of said triode plate resistors, the heated cathode of said cathode ray tube being connected to the voltage supply side of the heated cathode of the triode tube, the control grids of said triode tube having a condenser connected across the same, a mid-tap transformer winding, the opposite sides of said condenser being connected to the respective end terminals of said transformer winding and the mid-tap thereof being connected to the same side of the voltage supply that the heated cathode of the cathode ray tube is connected, and means for reversing the phase of the voltage induced in said transformer winding whereby one or the other of said target portions is illuminated and that when the voltages from said mid-tap to the opposite terminals of the transformer are equal the target portions of said cathode ray tube have equal but minimum energization.

2. A circuit for controlling the selective energization of diametrically opposite portions of the targets in a cathode ray tube, having a control electrode for each portion of the target and a heated cathode, comprising a high $\mu$ twin triode tube, a resistor connected to each plate of the triode tube, the opposite side of each of said resistors being connected together and being adapted for connection to the same side of an alternating current voltage supply source, said twin triode tube having a cathode and a heater therefor, and a control grid for each plate, said cathode being connected to one side of a resistor of relatively high ohmic value, the other side of said resistor being adapted for connection to the other side of said voltage supply, the cathode ray tube having its target connected to the supply voltage side of the plate resistors of the twin triode tube, and its control electrodes connected respectively to the plate sides of said triode plate resistors, the heated cathode of said cathode ray tube being connected to the voltage supply side of the heated cathode of the triode tube, the control grids of said triode tube having connected across the same, a mid-tap transformer winding, the mid-tap thereof being connected to the same side of the voltage supply that the heated cathode of the cathode ray tube is connected, and means for reversing the phase of the voltage induced in said transformer winding whereby one or the other of said target portions is illuminated and that when the voltages from said mid-tap to the opposite terminals of the transformer are equal the target portions of said cathode ray tube have equal but minimum energization.

KURT ALBRECHT.

References Cited in the file of this patent

UNITED STATES PATENTS

| Number | Name | Date |
|---|---|---|
| 2,175,700 | Roberts | Oct. 10, 1939 |
| 2,190,488 | Schnoll | Feb. 13, 1940 |
| 2,219,506 | Steimel et al. | Oct. 29, 1940 |
| 2,243,408 | Anderson et al. | May 27, 1941 |
| 2,262,407 | Rath | Nov. 11, 1941 |
| 2,263,932 | Schnoll | Nov. 25, 1941 |
| 2,318,140 | Clark | May 4, 1943 |
| 2,366,320 | Elston | Jan. 2, 1945 |
| 2,457,575 | Liebscher | Dec. 28, 1948 |